(12) United States Patent  
Kodama et al.

(10) Patent No.: US 9,732,972 B2
(45) Date of Patent: Aug. 15, 2017

(54) INFORMATION PROCESSING DEVICE AND CONTROLLING METHOD

(71) Applicant: FUJITSU LIMITED, Kawasaki-shi, Kanagawa (JP)

(72) Inventors: Hiroyoshi Kodama, Isehara (JP); Hiroshi Endo, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 504 days.

(21) Appl. No.: 14/476,914

(22) Filed: Sep. 4, 2014

(65) Prior Publication Data

US 2014/0371924 A1    Dec. 18, 2014

Related U.S. Application Data

(63) Continuation of application No. PCT/JP2012/058640, filed on Mar. 30, 2012.

(51) Int. Cl.
*F24F 11/00* (2006.01)
*G05D 23/19* (2006.01)
(Continued)

(52) U.S. Cl.
CPC .......... *F24F 11/0009* (2013.01); *G05D 23/19* (2013.01); *G06F 1/20* (2013.01); *G06F 1/28* (2013.01); *G06F 1/3203* (2013.01)

(58) Field of Classification Search
CPC .. F24F 11/0009; F24F 11/006; F24F 11/0012; F24F 2011/0075; F24F 2011/0068; G05B 15/02
See application file for complete search history.

(56) References Cited

U.S. PATENT DOCUMENTS 8,532,827 B2 * 9/2013 Stefanski ........... G05D 23/1902
 236/91 R
8,892,264 B2 * 11/2014 Steven .................. G06Q 50/06
 700/286

(Continued)

FOREIGN PATENT DOCUMENTS

AU   2008234969   5/2009
JP   2007-18483   1/2007

(Continued)

OTHER PUBLICATIONS

Liao et al., Weather-clustering based strategy design for dynamic demand response building HVAC control, Nov. 2012, 3 pages.*

(Continued)

*Primary Examiner* — Thuy Dao
(74) *Attorney, Agent, or Firm* — Staas & Halsey LLP

(57) ABSTRACT

A processor determines a target value of a temperature of a processing unit included in the information processing system on the basis of the temperature of the processing unit when first power consumption indicates a relatively low power consumption by referring to correlation information that indicates a change in the first power consumption, which is a total sum of second power consumption of the processing unit and third power consumption of an air-conditioning machine included in the information processing system, with respect to a change in the temperature of the processing unit. Then, the processor outputs a control signal for controlling the air-conditioning machine on the basis of the target value.

8 Claims, 15 Drawing Sheets

(51) Int. Cl.
  *G05D 23/00*  (2006.01)
  *G06F 1/20*  (2006.01)
  *G06F 1/28*  (2006.01)
  *G06F 1/32*  (2006.01)

(56) References Cited

U.S. PATENT DOCUMENTS

| | | | | |
|---|---|---|---|---|
| 9,175,867 | B2 * | 11/2015 | Grohman | F24F 11/0009 |
| 9,223,323 | B2 * | 12/2015 | Matas | F24F 11/0012 |
| 9,631,829 | B2 * | 4/2017 | Kaneko | F24F 11/0009 |
| 9,651,272 | B2 * | 5/2017 | Mori | H02J 3/14 |
| 2006/0239095 | A1 * | 10/2006 | Shi | G11C 7/04 365/222 |
| 2006/0279869 | A1 | 12/2006 | Yamamoto et al. | |
| 2007/0242385 | A1 | 10/2007 | Yamamoto et al. | |
| 2009/0119036 | A1 * | 5/2009 | Jayanth | F04B 49/065 702/60 |
| 2010/0023787 | A1 | 1/2010 | Ho et al. | |
| 2010/0058079 | A1 | 3/2010 | Yamamoto et al. | |
| 2010/0083018 | A1 | 4/2010 | Park et al. | |
| 2010/0246058 | A1 | 9/2010 | Yamamoto et al. | |
| 2010/0286830 | A1 * | 11/2010 | Wijaya | B60H 1/3205 700/276 |
| 2011/0059687 | A1 | 3/2011 | Katsui et al. | |
| 2011/0113273 | A1 | 5/2011 | Okitsu et al. | |
| 2011/0223849 | A1 | 9/2011 | Ishimine et al. | |
| 2011/0231030 | A1 | 9/2011 | Carter et al. | |
| 2012/0174608 | A1 * | 7/2012 | Kumamoto | F24F 11/0078 62/186 |
| 2013/0167571 | A1 * | 7/2013 | Nakagawa | F24F 11/0008 62/176.4 |

FOREIGN PATENT DOCUMENTS

| | | |
|---|---|---|
| JP | 2009-193247 | 8/2009 |
| JP | 2010-108324 | 5/2010 |
| JP | 2011-34578 | 2/2011 |
| JP | 2011-59741 | 3/2011 |
| JP | 2011-65444 | 3/2011 |
| JP | 2011-190967 | 9/2011 |
| JP | 2011-191974 | 9/2011 |

OTHER PUBLICATIONS

Li et al., ThermoNet: fine-grain building comfort-efficiency assessment, Nov. 2011, 2 pages.*
Bellala et al., Towards an understanding of campus-scale power consumption, Nov. 2011, 6 pages.*
International Search Report of PCT/JP2012/058640 mailed Jun. 5, 2012.
Extended European Search Report dated Feb. 6, 2015 in corresponding European Patent Application No. 12873441.5.
PCT International Preliminary Report on Patentability mailed Oct. 9, 2014 in corresponding International Patent Application No. PCT/JP2012/058640.
Office Action dated Feb. 22, 2017 in corresponding Chinese Patent Application No. 201280071693.2.

* cited by examiner

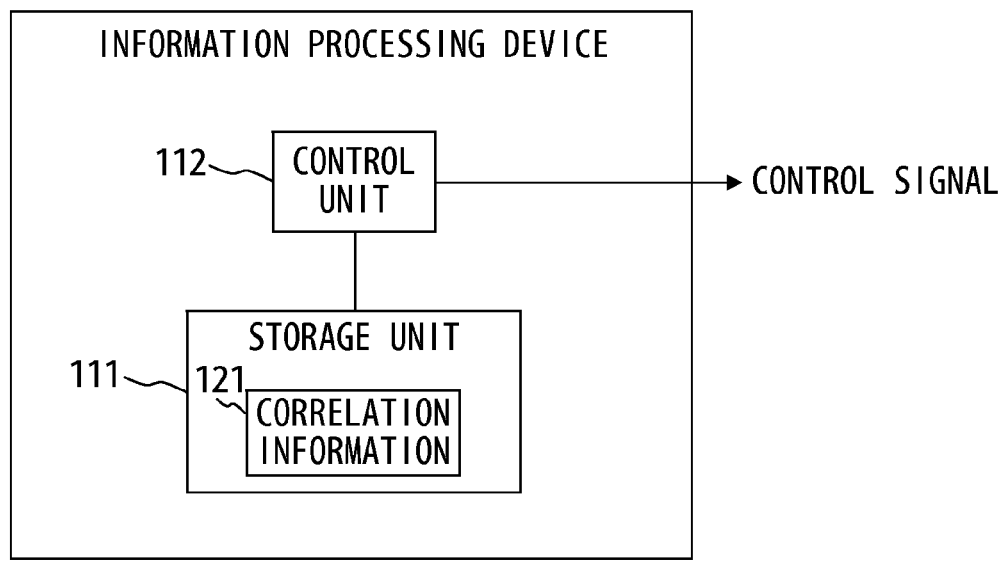
F I G. 1

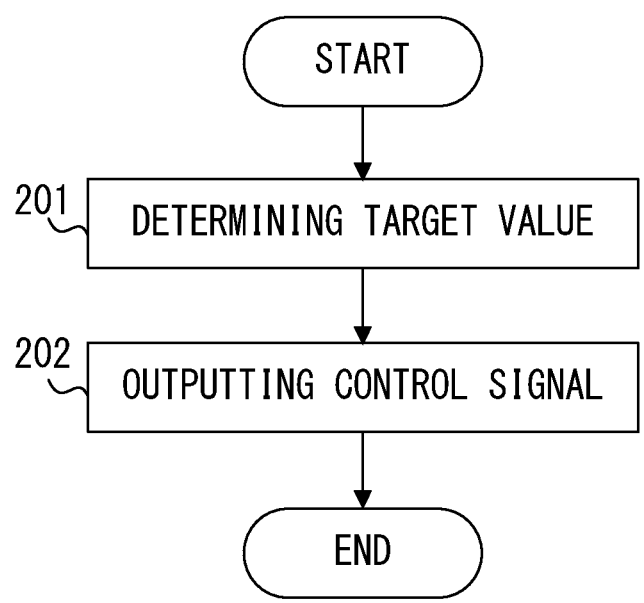
F I G. 2

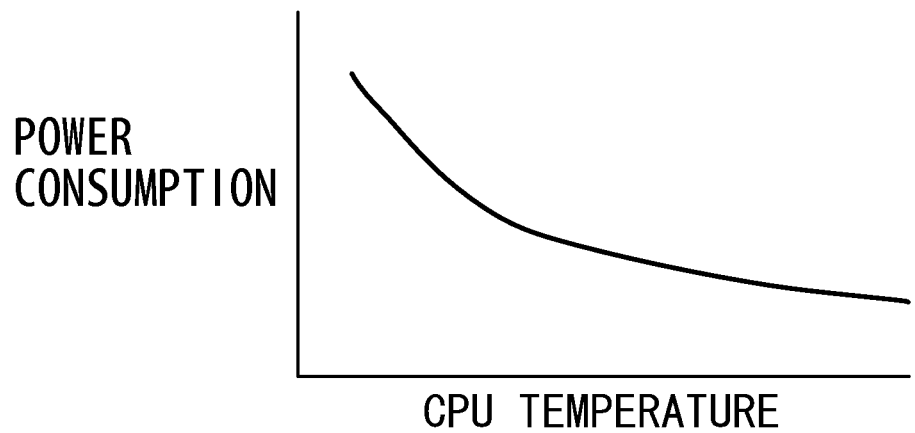
F I G. 7

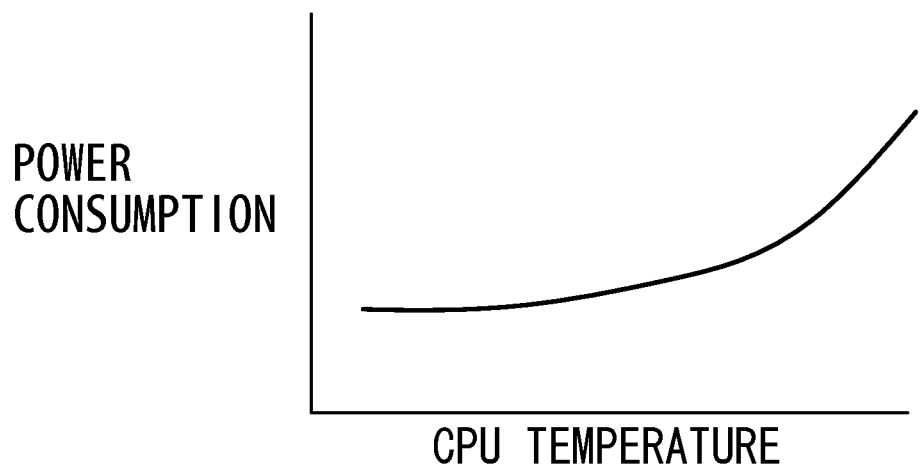
F I G. 8

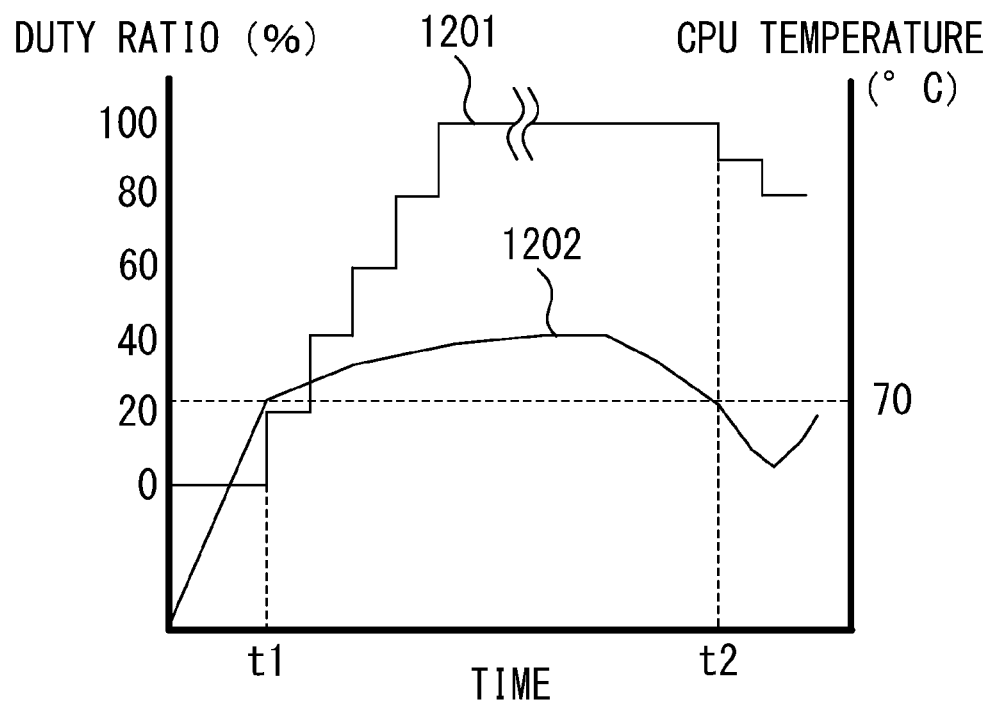
F I G. 1 2

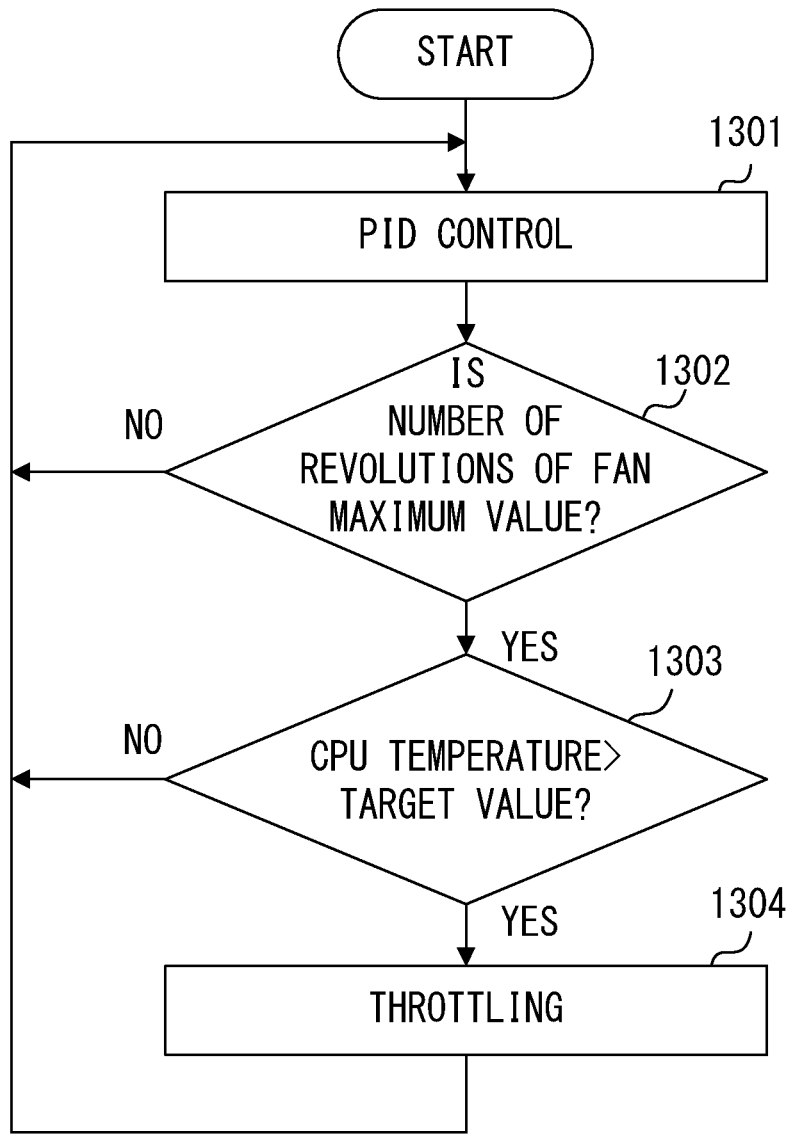
F I G. 13

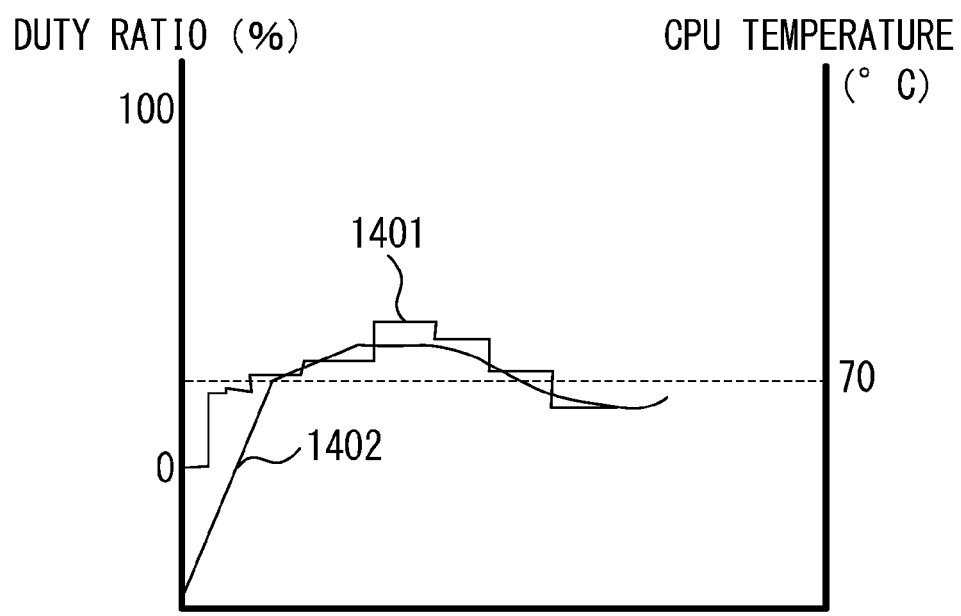
F I G. 1 4

| FAN UNIT ID 1501 | RACK ID 1502 | INTRA-RACK POSITION 1503 | DEVICE ID 1504 |
|---|---|---|---|
| F1 | R1 | 1U | SV1 |
| | | 2U | SV2 |
| | | ⋮ | ⋮ |
| | | 41U | SV41 |
| | | 42U | SW1 |
| F2 | R2 | 1U | SV42 |
| | | 2U | SV43 |
| | | ⋮ | ⋮ |
| | | 41U | SV82 |
| | | 42U | SW2 |
| F3 | R3 | 1U | SV83 |
| | | 2U | SV84 |
| | | ⋮ | ⋮ |
| | | 41U | SV123 |
| | | 42U | SW3 |

FIG. 15

INFORMATION PROCESSING DEVICE AND CONTROLLING METHOD

CROSS-REFERENCE TO RELATED APPLICATION

This application is a continuation application of International Application PCT/JP2012/058640 filed on Mar. 30, 2012 and designated the U.S., the entire contents of which are incorporated herein by reference.

FIELD

The present invention relates to an information processing device and a controlling method.

BACKGROUND

With the progress in cloud services, power consumed by data centers, with an information processing system as a base, is expected to significantly increase in the future, and saving power in data centers is under study.

The power consumed by a data center includes power consumed by information technology (IT) devices such as a server, a network device, a storage device and the like, and that consumed by air-conditioning machines for cooling down the IT devices and the like. The power consumed by the air-conditioning machines accounts for a large percentage of the total power consumption. Accordingly, to save the power in a data center, not only reductions in the power consumption of IT devices but reductions in the power consumption of air-conditioning machines, which account for a large percentage, are under study.

A large data center is provided in a robust building, and includes equipment such as a power-feeding system to cope with blackouts, an advanced security system, and the like, and employs highly efficient air-conditioning machines that take into account an operating environment of IT devices in many cases.

In the meantime, in recent years, attention has been focused on container data centers that can be provided at a short delivery time, have a high equipment expandability, and can be provided by less initial investment, and container data centers have begun being operated. In such a container data center, power consumed by air-conditioning machines can be reduced by using the external air to cool down IT devices.

Also a technique is known for enabling servers to be integrated in a high density by omitting a cold aisle for cooling down the air, or a ventilation flue within racks in a data center.

Additionally, a technique is known for reducing the volume of cooling air by providing a supply port in a data center for supplying cooling air blown by an air-conditioning machine into the area of a flow passage up to an intake of an exhaust of hot air emitted from an electronic device.

Furthermore, a technique is known for improving cooling efficiency by providing a grille that cools down the air within an accommodation room for accommodating IT devices, supplies the cooled air under the floor, and circulates the air within the accommodation room in a data center.

Patent Document 1: Japanese Laid-open Patent Publication No. 2011-191974

Patent Document 2: Japanese Laid-open Patent Publication No. 2011-190967

Patent Document 3 Japanese Laid-open Patent Publication No. 2011-59741

SUMMARY

In one proposal, an information processing device includes a memory and a processor. The memory stores correlation information. The correlation information is information that indicates a change in first power consumption, which is a total sum of second power consumption of a processing unit included in an information processing system and third power consumption of an air-conditioning machine included in the information processing system, with respect to a change in a temperature of the processing unit. The processor determines a target value of the temperature of the processing unit on the basis of the temperature of the processing unit when the first power consumption indicates a relatively low power consumption by referring to the correlation information stored in the memory, and outputs a control signal for controlling the air-conditioning machine on the basis of the target value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a configuration of an information processing device;

FIG. 2 is a flowchart illustrating a first air-conditioning machine control process;

FIG. 7 illustrates a relationship between a CPU temperature and power consumption of a fan unit;

FIG. 8 illustrates a relationship between a CPU temperature and power consumption of a CPU;

FIG. 12 illustrates a change in a CPU temperature in the first fan revolution number control process;

FIG. 13 is a flowchart illustrating a second fan revolution number control process;

FIG. 14 illustrates a change in a CPU temperature in the second fan revolution number control process; and FIG. 15 illustrates fan placement information.

DESCRIPTION OF EMBODIMENTS

Figure 3:
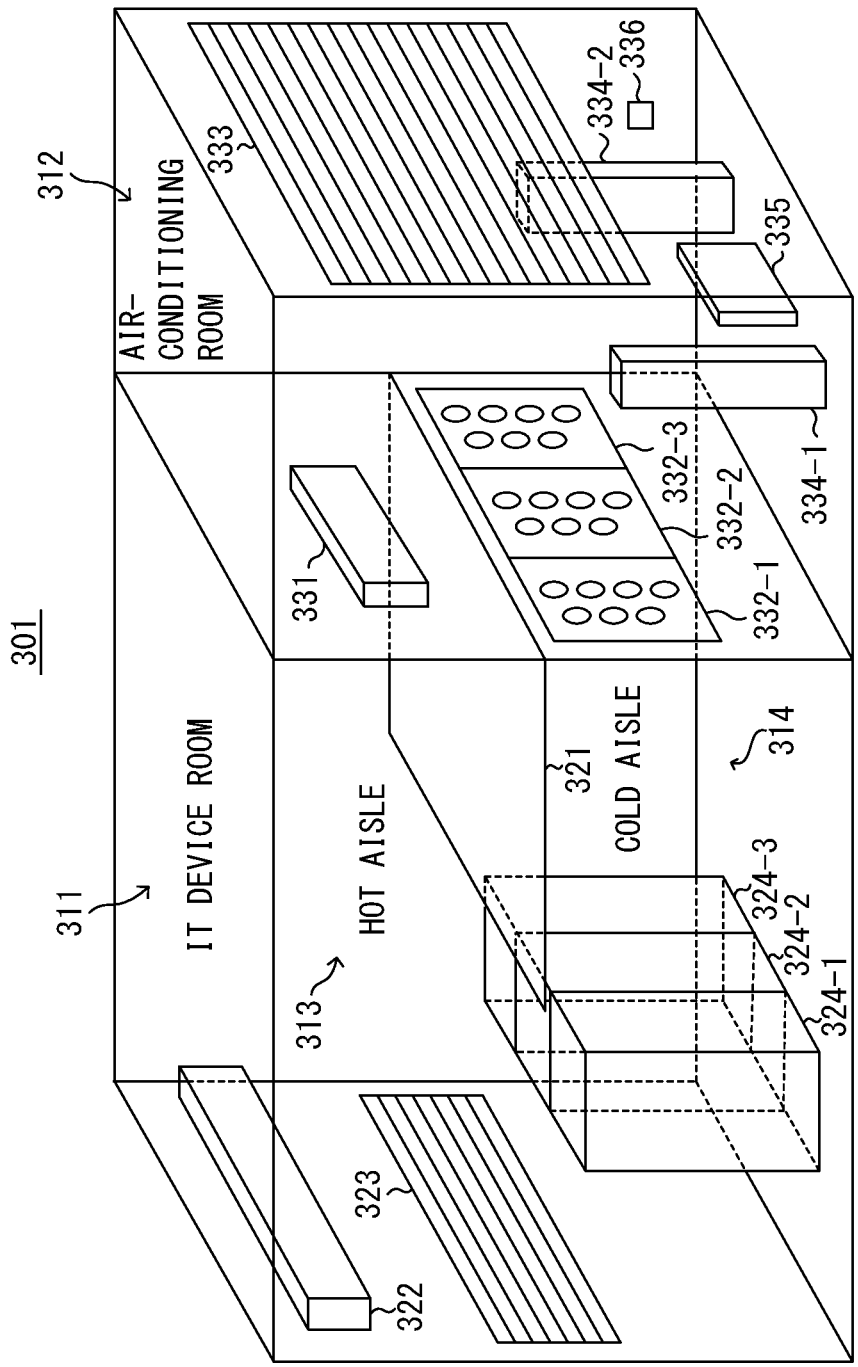
FIG. 3 illustrates a configuration of an information processing system.

Embodiments are described in detail below with reference to the drawings.

The above described conventional data center has the following problem.

Air-conditioning machines in a container data center include a cooling device that cools down exhaust air warmed by operations of IT devices, an air-conditioning fan that sends the cooled air into an IT device room, and an integral fan that is provided within a housing of a server and cools down components. The cooling device discharges the air cooled down at a set temperature on the basis of environment information such as a temperature, humidity and the like, which are obtained from a sensor installed in the periphery of a rack that accommodates a server. Moreover, the server secures the volume of air to cool down components such as a central processing unit (CPU) and the like by operating the integral fan.

Power consumed by the integral fan of the server sometimes accounts for 20 to 40 percent of the power consumed by the entire server, and the power increases as the number of servers within a data center grows. When the number of servers within the data center grows, a temperature of exhaust air generated by operations of the servers also rises. Therefore, power consumed by the cooling device that cools down the exhaust air and by air-conditioning fans is also expected to increase.

Such a problem occurs not only in a container data center but also in other information processing systems, such as a large data center, including an air-conditioning machine.

To reduce power consumption of individual servers in a data center, it is effective to employ fanless servers, which are servers that do not include an integral fan. By employing fanless servers, power consumed by integral fans is enabled to be reduced. When fanless servers are employed, the air cooled down by a cooling device is considered to be sent to an IT device room. Therefore, suitable control of the volume of air of an air-conditioning fan is sought.

FIG. 1 illustrates an example of a configuration of an information processing device (computer) used in an information processing system such as a data center or the like. The information processing device 101 illustrated in FIG. 1 includes a storage unit 111 and a control unit 112. The storage unit 111 stores correlation information 121. The correlation information 121 is information that indicates a change in first power consumption, which is a total sum of second power consumption of a CPU included in the information processing system and third power consumption of an air-conditioning machine included in the information processing system, with respect to a change in a temperature of the CPU.

The control unit 112 determines a target value of a temperature of a CPU on the basis of the temperature of the CPU when the first power consumption indicates a relatively low power consumption by referring to the correlation information 121 stored in the storage unit 111, and outputs a control signal for controlling the air-conditioning machine on the basis of the target value.

FIG. 2 is a flowchart illustrating an example of an air-conditioning machine control process executed by the information processing device 101 illustrated in FIG. 1. The control unit 112 determines a target value of a CPU temperature on the basis of the CPU temperature when the first power consumption indicates relatively low power consumption by referring to the correlation information 121 (step 201), and outputs a control signal for controlling the air-conditioning machine on the basis of the target value (step 202).

With such an air-conditioning machine control process, power consumption of an information processing system including an air-conditioning machine is enabled to be prevented from being increased.

FIG. 3 illustrates an example of a configuration of an information processing system such as a data center or the like. The information processing system 301 illustrated in FIG. 3 is, for example, a container data center, and includes an IT device room 311 and an air-conditioning room 312.

In the IT device room 311, a partition board 321, a switchboard 322, an air outlet 323, and racks 324-1 to 324-3 are provided. Each of the racks 324-i (i=1, 2, 3) accommodates one or more IT devices such as a server, a network device, a storage device, and the like. The IT device room 311 is partitioned by the partition board 321 into a hot aisle 313 to which an exhaust heat from the IT devices is released, and a cold aisle 314 into which cooled air from the air-conditioning room 312 flows.

In the meantime, in the air-conditioning room 312, a damper 331, fan units 332-1 to 332-3, an air inlet 333, a cooling device 334-1, a cooling device 334-2, an air-conditioning control device 335, and a sensor 336 are provided. Each of the fan units 332-i (i=1, 2, 3) includes one or more fans.

The air inlet 333 of the air-conditioning room 312 and the air outlet 323 of the IT device room 311 are provided with a louver. The external air, which is the air external to the information processing system, is taken from the air inlet 333 into the air-conditioning room 312, and sent from the fan units 332-1 to 332-3 to the IT device room 311. The fan units 332-1 to 332-3 are present at positions that are respectively opposed to the racks 324-1 to 324-3 within the IT device room 311, and send the air to a front face of the racks via the cold aisle 314.

The air warmed up by the exhaust heat emitted from the IT devices within the racks 324-1 to 324-3 is released from aback face of the racks to the hot aisle 313, and emitted outside the information processing system 301 via the air outlet 323.

The sensor 336 is a sensor intended to measure an external temperature (atmospheric temperature) and humidity. The cooling devices 334-1 and 334-2 have a function of cooling down and damping the external air taken into the air-conditioning room 312. For the temperature and the humidity at which the IT devices operate, an upper limit value and a lower limit value are respectively decided. A temperature range is, for example, 10 degrees Celsius to 35 degrees Celsius, and a humidity range is, for example, 10 percent to 80 percent.

Accordingly, when the temperature of the external air, which is measured by the sensor 336, is higher than the upper limit value, the external air may be cooled down by the cooling device 334-1 and the cooling device 334-2, and sent to the IT device room 311. Moreover, when the humidity of the external air, which is measured by the sensor 336, is lower than the lower limit value, the external air may be damped by the cooling device 334-1 and the cooling device 334-2, and sent to the IT device room 311. As the cooling device 334-1 and the cooling device 334-2, for example, a cooling device of a vaporization type is used.

Alternatively, when the temperature of the external air measured by the sensor 336 is lower than the lower limit value, warm air within the IT device room 311 may be taken into the air-conditioning room 312 via the damper 331, and the external air taken into the air-conditioning room 312 will then be mixed with the warm air, and the mixed air sent to the IT device room 311.

The air-conditioning control device 335 is a device that controls air-conditioning machines such as the damper 331, the fan units 332-1 to 332-3, the cooling device 334-1, the cooling device 334-2, the sensor 336, and the like. As the air-conditioning control device 335, for example, a programmable controller is used.

Additionally, a breaker for supplying power to various types of devices within the information processing system 301 is provided in the switchboard 322. The various types of devices include IT devices, the damper 331, the fan units 332-1 to 332-3, the cooling device 334-1, the cooling device 334-2, the sensor 336, lighting equipment not illustrated, and the like.

Note that the number of the racks 324 and that of the fan units 332 are not limited to three, and may be an integer equal to or larger than 1. Also the number of the cooling devices 334 is not limited to two, and may be an integer equal to or larger than 1.

Figure 4:
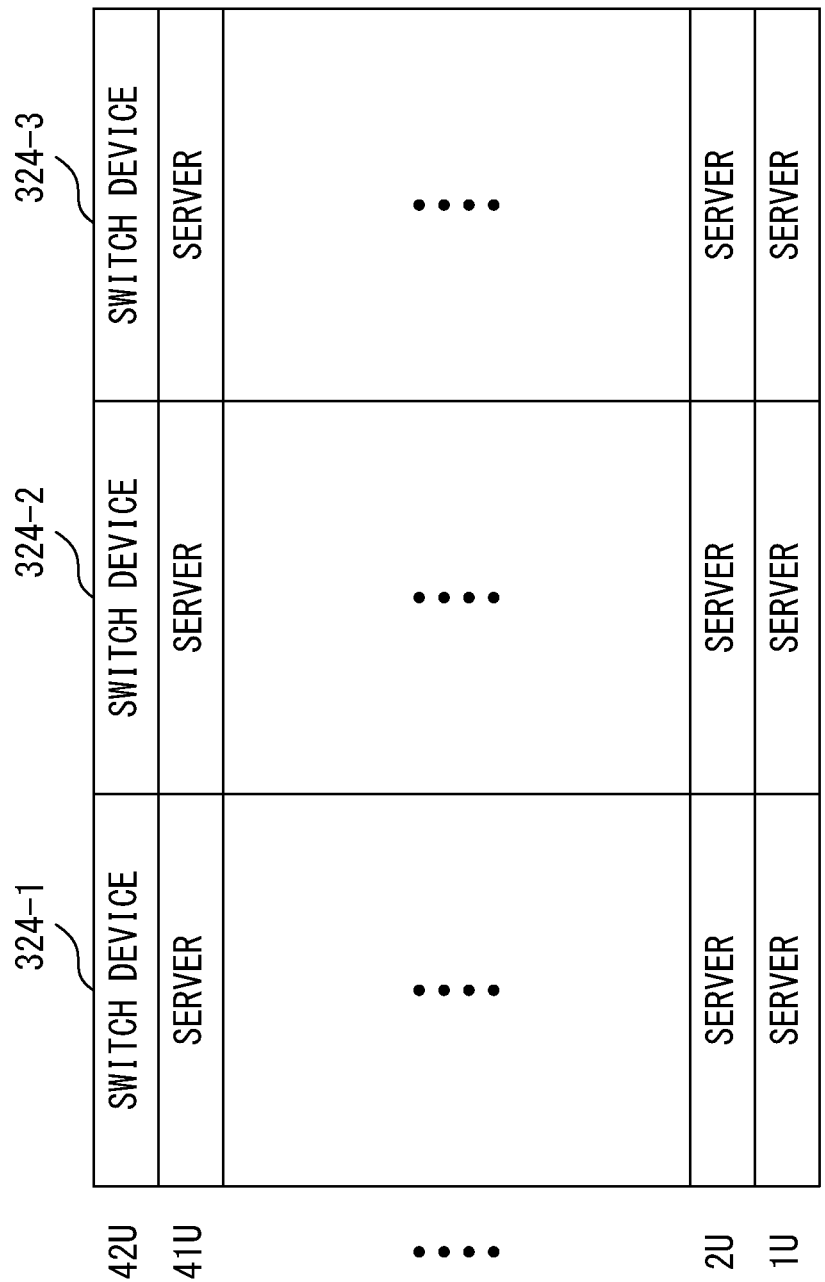
FIG. 4 illustrates a configuration of racks.

FIG. 4 illustrates an example of a configuration of the racks 324 illustrated in FIG. 3. In the example illustrated in FIG. 4, each of the racks 324-$i$ is able to accommodate IT devices of 42 stages 1U to 42U. In the stages 1U to 41U, fanless servers are accommodated. In the stage 24U, a switch device is accommodated. Note that, however, the number of stages of each of the racks is not limited to 42 and may be an integer equal to or larger than 1. Each of the stages may accommodate a different IT device. For example, a server having an integral fan may be accommodated as a replacement for a fanless server.

Figure 5:
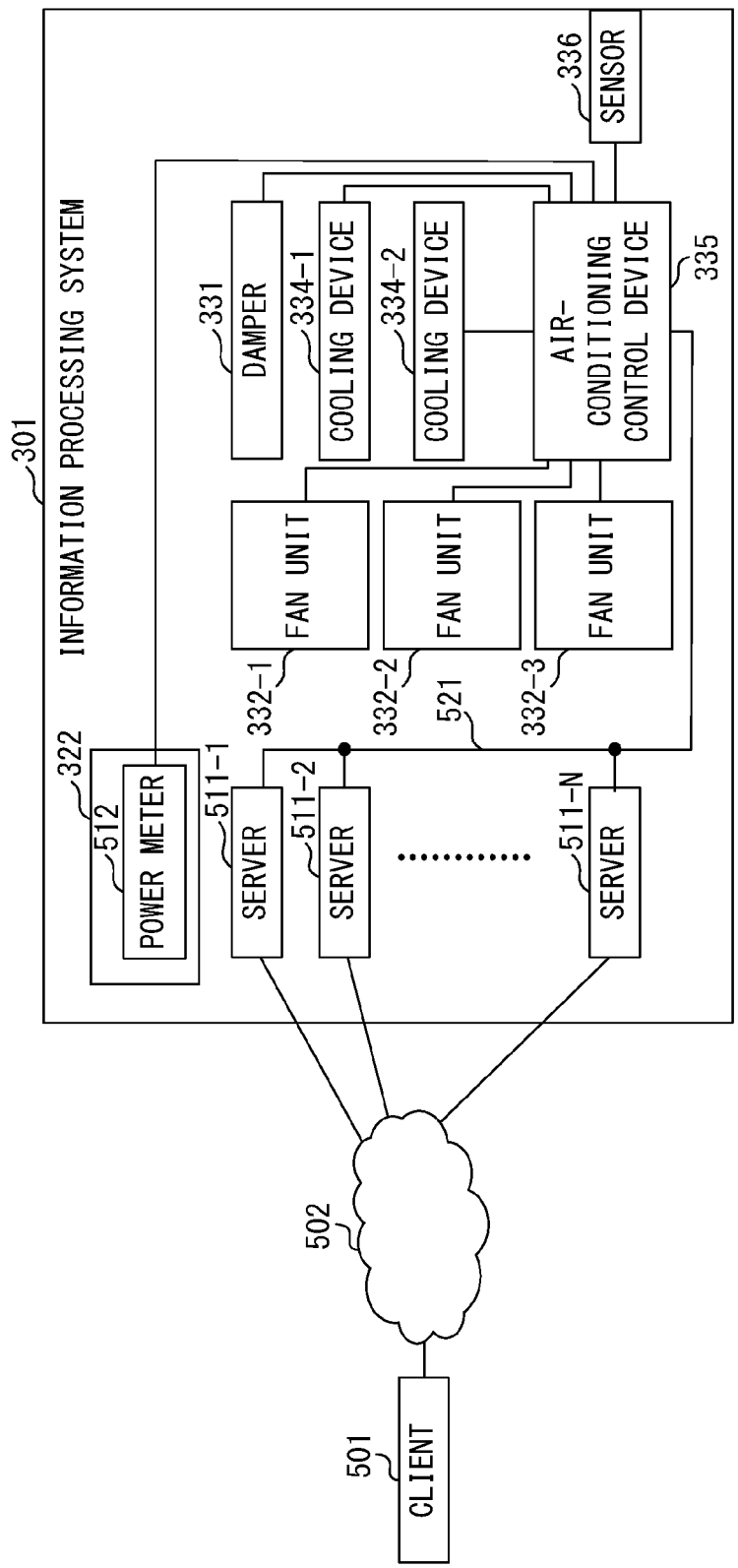
FIG. 5 illustrates a service operation form including the information processing system.

FIG. 5 illustrates a service operation form including the information processing system 301 illustrated in FIG. 3. A client 501 transmits a processing request to servers 511-1 to 511-N (N is an integer equal to or larger than 1) of the information processing system 301 via a communication network 502 such as the Internet or the like. Each of the servers 511-$j$ (j=1, 2, . . . , N) is a server accommodated by one of the racks 324-1 to 324-3. The server 511-$j$ executes information processing in response to the processing request transmitted from the client 501, and returns a result of the processing to the client 501 via the communication network 502.

The servers 511-1 to 511-N and the air-conditioning control device 335 are able to communicate with one another via a communication network 521 such as a local area network (LAN) or the like. One of the servers 511-1 to 511-N operates as the information processing device 101 that is illustrated in FIG. 1 and executes the air-conditioning machine control process. For the sake of convenience, the server 511-1 is hereinafter assumed to operate as the information processing device 101.

In the breaker within the switchboard 322, a power meter 512 is provided. The power meter 512 measures a total power consumption of the information processing system 301, and notifies the air-conditioning control device 335 of the measured value. When a plurality of breakers are provided respectively for a plurality of power distribution systems, one power meter 512 is provided for each of the breakers, and each of the power meters 512 notifies the air-conditioning control device 335 of the power consumption of each of the power distribution systems.

The sensor 336 measures the temperature and the humidity of the external air, and notifies the air-conditioning control device 335 of the measured values. The air-conditioning control device 335 is able to control the damper 331, the fan units 332-1 to 332-3, the cooling device 334-1, and the cooling device 334-2 on the basis of the notified temperature and humidity of the external air.

Furthermore, the air-conditioning control device 335 notifies the server 511-1 of the information such as the measured temperature of the external air, measured power consumption, and the like. The servers 511-2 to 511-N notify the server 511-1 of information of their CPU temperature, CPU load, and the like.

The server 511-1 determines a target value of a CPU temperature by executing the air-conditioning machine control process on the basis of the notified information, and transmits, to the air-conditioning control device 335, a control signal for controlling an air-conditioning machine on the basis of the target value. Then, the air-conditioning control device 335 controls the damper 331, the fan units 332-1 to 332-3, the cooling device 334-1, and the cooling device 334-2 in accordance with the received control signal.

Figure 6:
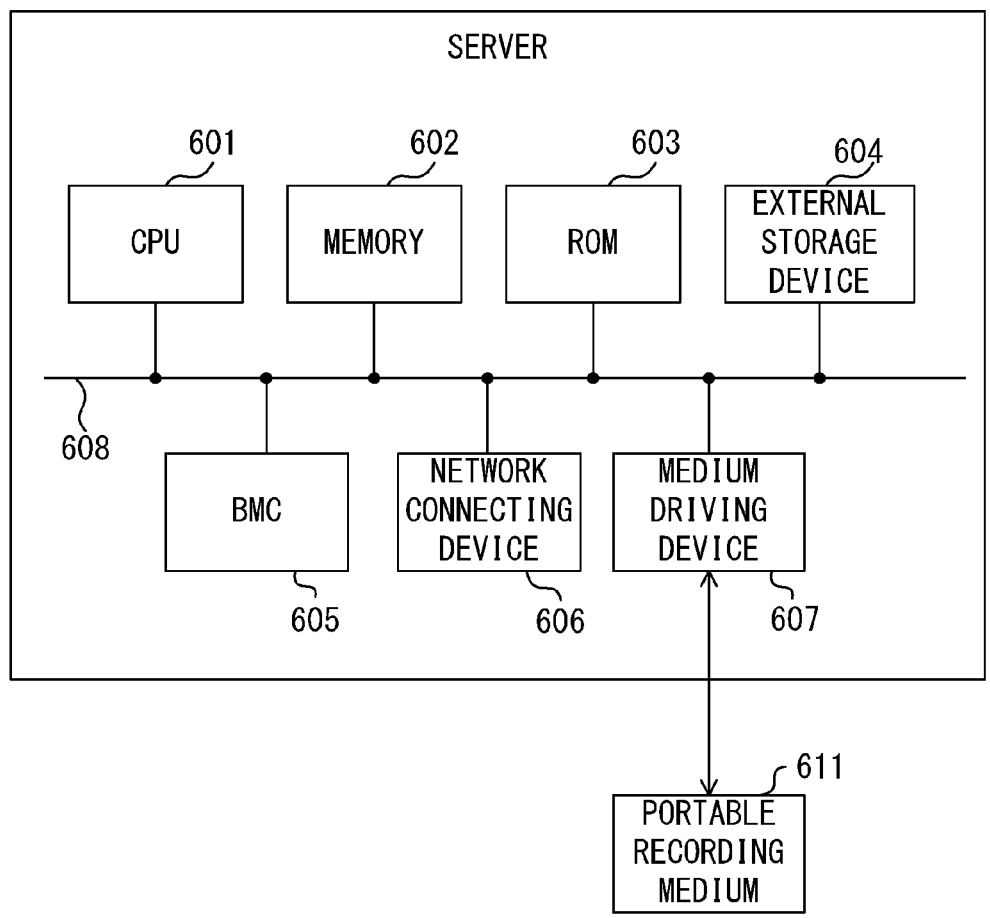
FIG. 6 illustrates a configuration of a server.

FIG. 6 illustrates an example of a configuration of the server 511 illustrated in FIG. 5. The server 511 illustrated in FIG. 6 includes a CPU 601 (processor), a memory 602, a read only memory (ROM) 603, an external storage device 604, a baseboard management controller (BMC) 605, a network connecting device 606, and a medium driving device 607. These components are interconnected by a bus 608.

The CPU 601 incorporates a temperature sensor that measures a CPU temperature. The memory 602 is a semiconductor memory such as a random access memory (RAM) or the like. The ROM 603 is a memory that stores a program used for processes.

The CPU 601 within the server 511-1 operates as the control unit 112 illustrated in FIG. 1 and executes the air-conditioning control machine control process by executing a program with the use of the memory 602. The memory 602 is also available as the storage unit 111 illustrated in FIG. 1.

Additionally, the CPU 601 is able to obtain information of a CPU load by executing a management program. As the information of the CPU load, for example, a CPU usage rate is used. The CPU 601 within the servers 511-2 to 511-N notifies the server 511-1 of the obtained information of the CPU load via the network connecting device 606.

The external storage device 604 is, for example, a magnetic disk device, an optical disk device, a magneto-optical disk device, a tape device, or the like. The external storage device 604 also includes a hard disk drive. The server 511 is able to store a program and data in the external storage device 604, and use the program and the data by loading them into the memory 602.

The BMC 605 is a monitoring device that monitors operations of hardware within the server 511, and obtains information of a CPU temperature from the temperature sensor within the CPU 601. The BMC 605 within the server 511-1 transfers the obtained information of the CPU temperature to the CPU 601.

In the meantime, the BMC 605 within the servers 511-2 to 511-N notifies the server 511-1 of the obtained information of the CPU temperature via the network connecting device 606. The server 511-1 controls the air-conditioning machine to make the notified CPU temperature closer to the target value of the temperature of the CPU 601.

The network connecting device 606 is a communication interface that is connected to the communication network 502 and the communication network 521 and performs a data conversion accompanying a communication. The server 511 is able to receive a program and data from an external device via the network connecting device 606, and use the program and the data by loading them into the memory 602.

The medium driving device 607 drives the portable recording medium 611, and accesses recorded contents of the medium. The portable recording medium 611 is a memory device, a flexible disk, an optical disk, a magneto-optical disk, or the like. The portable recording medium 611 may be a compact disk read only memory (CD-ROM), a digital versatile disk (DVD), a flash memory, a universal serial bus (USB) memory, or the like. A user or an operator is able to store a program and data on the portable recording medium 611, and use the program and the data by loading them into the memory 602.

The computer-readable recording medium as described above that stores a program and data which are used for the processes includes a physical (non-transitory) recording medium such as the memory 602, the ROM. 603, the external storage device 604, and the portable recording medium 611.

Note that the server 511 does not need to include all the components illustrated in FIG. 6. Some of the components may be omitted depending on an application purpose or a condition. For example, when the server 511 does not access the portable recording medium 611, the medium driving device 607 may be omitted. Moreover, the number of CPUs 601 and of memories 602 and the like which are included in the server 511 are not limited to one, and may be an integer equal to or larger than 1.

Away of determining the correlation information 121 illustrated in FIG. 1 is described next with reference to FIGS. 7 to 9.

FIG. 7 illustrates a relationship between a temperature at the time of operations of a CPU 601 within the server 511 and power consumption of a fan unit 332. When the number of revolutions of a fan included in the fan unit 332 is decreased, the temperature of the CPU 601 rises even though the power consumption of the fan unit 332 decreases.

FIG. 8 illustrates a relationship between a temperature at the time of operations of a CPU 601 within the server 511 and power consumption of the CPU 601. When the temperature of the CPU 601 rises, a leak current within the CPU 601 increases. Therefore, the power consumption of the CPU 601 increases even though the CPU operates with the same CPU load imposed.

As described above, a cause-and-effect relationship is proved to exist such that the temperature of a CPU 601 rises to increase the power consumption of the CPU 601 when the number of revolutions of a fan is decreased to reduce the power consumption of the information processing system 301, which makes the power consumption of the information processing system 301 start to increase.

Figure 9:
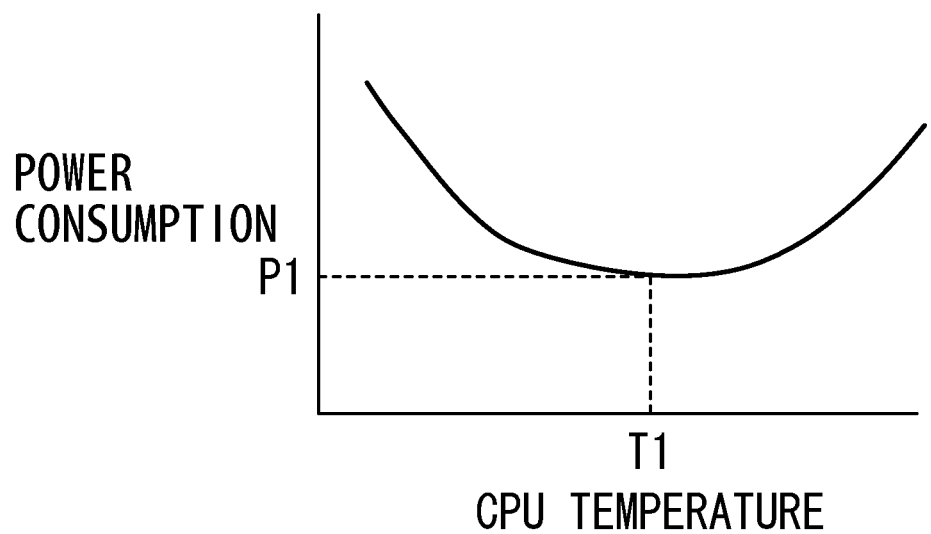
FIG. 9 illustrates a CPU temperature and total power consumption.

FIG. 9 illustrates a relationship between a temperature at the time of operations of a CPU 601 within the server 511 and a total power consumption including the power consumption of the CPU 601 and that of a fan unit 332. When the total power consumption is decreased by reducing the power consumption of the fan unit 332, the temperature of the CPU 601 rises. Accordingly, it is expected that the power consumption of the CPU 601 will rise with an increase in a leak current and the total power consumption will start to increase at a temperature T1. The total power consumption P1 at the temperature T1 corresponds to a minimal value of the total power consumption.

Accordingly, by monitoring the total power consumption of the information processing system 301 and the temperature of each of the CPUs 601 within each of the servers 511, a change in the total power consumption with respect to a change in the temperature of each of the CPUs 601 as illustrated in FIG. 9 is determined, and the determined change is available as the correlation information 121.

In this case, a target value of the temperature of the CPU 601 is enabled to be determined on the basis of the temperature of the CPU 601 when the total power consumption indicates a relatively low power consumption in the correlation information 121. Moreover, by controlling the number of revolutions of a fan with the use of the target value, the power consumption of the information processing system 301 is prevented from being increased. For example, the temperature T1 corresponding to the minimal value P1 of the total power consumption of the information processing system 301 is available as the target value of the temperature of the CPU 601.

Figure 10:
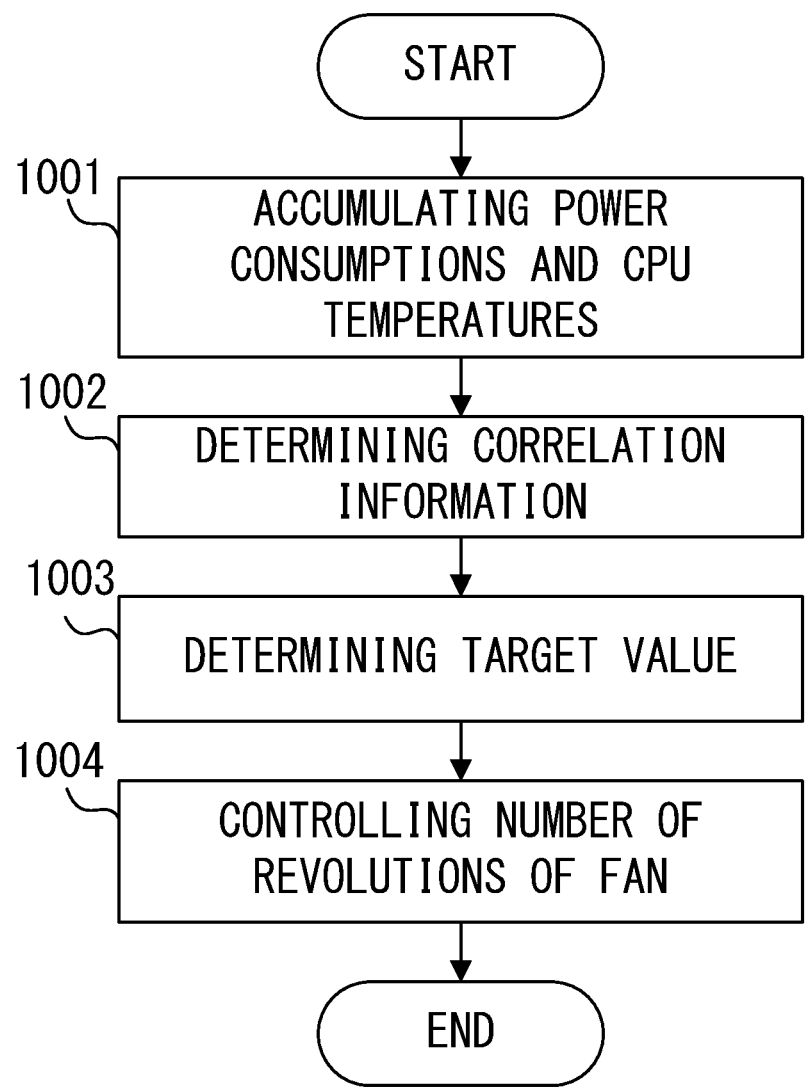
FIG. 10 is a flowchart illustrating a second air-conditioning machine control process.

FIG. 10 is a flowchart illustrating an example of the air-conditioning machine control process executed by the control unit 112 within the server 511-1. The control unit 112 initially accumulates information of the CPU temperature and the CPU load of the server 511-1, information of a CPU temperature and a CPU load, which are reported from each of the servers 511-2 to 511-N, and information reported from the air-conditioning control device 335 in association with each date and time (step 1001). The information reported from the air-conditioning control device 335 includes a measurement value of power consumption of each power distribution system, which is measured by the power meter 512, and a measurement value of the temperature of the external air, which is measured by the sensor 336.

Next, the control unit 112 classifies the power consumptions and the CPU temperatures of corresponding power distribution systems by a numerical value range of the temperature of the external air and that of the CPU load, and determines the correlation information 121 by using the power consumptions and the CPU temperatures which are classified respectively by the numerical value ranges (step 1002). Then, the control unit 112 stores, in the storage unit 111, a plurality of pieces of the correlation information 121 which correspond to the plurality of numerical value ranges of the temperature of the external air and the CPU load.

For example, the following method is conceivable as a way of determining the correlation information 121.

(1) A total sum of power consumptions of the power distribution systems is obtained as a total power consumption. Then, the correlation information 121 that indicates a relationship between the total power consumption of the information processing system 301 and a CPU temperature is determined for each of the CPUs 601 by making an association between a total power consumption for each date and time and the CPU temperature of each of the CPUs 601.

(2) A total sum of power consumptions of the power distribution systems is obtained as the total power consumption, and an average value of CPU temperatures of the plurality of CPUs 601 within each server 511 is obtained. Then, the correlation information 121 that indicates a relationship between the total power consumption of the information processing system 301 and a CPU temperature is determined for each of the servers 511 by making an association between the total power consumption and the average value of the CPU temperatures for each date and time.

(3) A total sum of power consumptions of the power distribution systems is obtained as a total power consumption, and an average value of the CPU temperatures of the plurality of CPUs 601 within the information processing system 301 is obtained. Then, the correlation information 121 that indicates a relationship between the total power consumption of the information processing system 301 and an average value of the CPU temperatures of all the CPUs 601 is determined by making an association between the total power consumption and the average value of the CPU temperatures of all the CPUs 601 for each date and time.

Next, the control unit 112 determines a CPU temperature corresponding to the minimal value of the total power consumption on the basis of the correlation information 121 corresponding to numerical value ranges to which the current temperature of the external air and the current value of the CPU load respectively belong, and chooses the determined CPU temperature as the target value (step 1003).

When the correlation information 121 is determined for each of the CPUs 601, the CPU temperature corresponding to the minimal value of the total power consumption in the correlation information 121 of each of the CPUs 601 is chosen as the target value of the CPU temperature of the corresponding CPU 601. Moreover, when the correlation information 121 is determined for each of the servers 511, the CPU temperature corresponding to the minimal value of the total power consumption in the correlation information 121 of each of the servers 511 is chosen as the target value of the CPU temperature of the corresponding server 511.

Then, the control unit 112 controls the number of revolutions of the fan included in the fan unit 332 on the basis of the chosen target value (step 1004).

When the information processing system 301 is installed in an environment where the temperature of the external air falls within a certain range, there is no need to determine the correlation information 121 for each numerical range of the temperature of the external air. Accordingly, the air-conditioning control device 335 does not need to notify the server 511-1 of the temperature of the external air, which is measured by the sensor 336. In this case, the correlation information 121 corresponding to the current CPU load is used in step 1003.

Additionally, when the CPU load falls within a certain range, there is no need to determine the correlation information 121 for each numerical value range of the CPU load. Accordingly, the server 511-1 does not need to obtain a CPU load, and the servers 511-2 to 511-N do not need to notify the server 511-1 of their CPU load. In this case, the correlation information 121 corresponding to the current temperature of the external air is used in step 1003.

Furthermore, when the correlation information 121 is determine with a simulation, there is no need to accumulate actual total power consumptions and CPU temperatures in all cases. Accordingly, the air-conditioning control device 335 does not need to notify the server 511-1 of the power consumption of each of the power distribution systems, which is measured by the power meter 512. Moreover, the server 511-1 does not need to obtain a CPU temperature, and the servers 511-2 to 511-N do not need to notify the server 511-1 of their CPU temperature.

Figure 11:
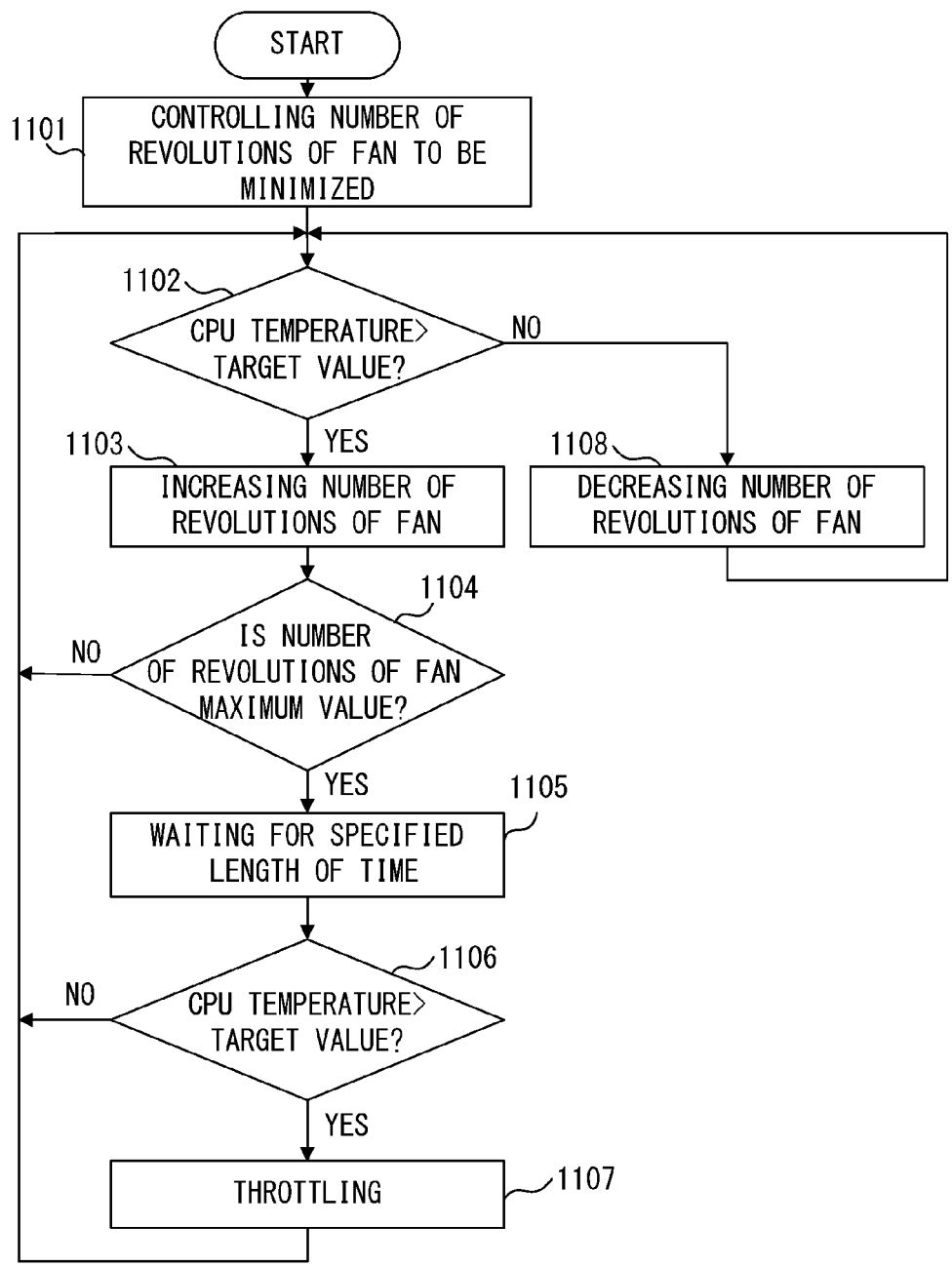
FIG. 11 is a flowchart illustrating a first fan revolution number control process.

FIG. 11 is a flowchart illustrating an example of the fan revolution number control process executed in step 1004 illustrated in FIG. 10. The control unit 112 initially transmits, to the air-conditioning control device 335, a control signal for controlling the number of revolutions of a fan to be minimized (step 1101), and makes a comparison between a CPU temperature and a target value at specified time intervals (step 1102).

To cool down the CPU 601 on which the highest CPU load is imposed within the information processing system 301 with a high priority, a comparison is made, for example, between the CPU temperature of the CPU on which the highest CPU load is currently imposed and a target value. At this time, when the correlation information 121 is determine for each of the CPUs 601, the target value of the CPU 601 on which the highest CPU load is imposed is used for the comparison. Alternatively, when the correlation information 121 is determine for each of the servers 511, the target value of the server 511 that includes the CPU 601 on which the highest CPU load is imposed is used for the comparison. Moreover, when the correlation information 121 is determine for all the CPUs 601 within the information processing system 301, a target value for all the CPUs 601 is used for the comparison.

Note that the comparison may be made between the target value and the CPU temperature of the CPU 601 in which the CPU temperature is currently the highest as a replacement for the CPU 601 in which the highest CPU load is currently imposed.

When the CPU temperature is higher than the target value ("YES" in step 1102), the control unit 112 transmits, to the air-conditioning control device 335, a control signal for increasing the number of revolutions of the fan by a specified value in order to cool down the CPU 601 (step 1103). Then, the control unit 112 checks whether the number of revolutions of the fan has reached a maximum value (step 1104). When the number of revolutions of the fan has not reached the maximum value ("NO" in step 1104), the control unit 112 repeats the processes in and after step 1102.

In the meantime, when the CPU temperature is equal to or lower than the target value ("NO" in step 1102), the control unit 112 transmits, to the air-conditioning control device 335, a control signal for decreasing the number of revolutions of the fan by a specified value in order to reduce the power consumption (step 1108). Then, the control unit 112 repeats the processes in and after step 1102. By setting the increment of the number of revolutions of the fan in step 1103 to a value larger than the decrement of the number of revolutions of the fan in step 1108, the CPU 601 is enabled to be quickly cooled down.

When the number of revolutions of the fan reaches the maximum value ("YES" in step 1104), the control unit 112 makes a comparison between the CPU temperature and the target value (step 1106) after the control unit 112 waits for a certain length of time (step 1105). When the CPU temperature is equal to or lower than the target value ("NO" in step 1106), the control unit 112 repeats the processes in and after step 1102.

In the meantime, when the CPU temperature is higher than the target value ("YES" in step 1102), the control unit 112 performs throttling for the CPU 601 in which the CPU temperature is higher than the target value (step 1107). Then, the control unit 112 repeats the processes in and after step 1102.

In the throttling performed for the CPU 601 in step 1107, an operating frequency of the CPU 601 is restricted. As a result, an operating temperature of the CPU 601 is expected to drop. Thereafter, when the CPU temperature drops to the target value or lower ("NO" in step 1102), the control unit 112 decreases the number of revolutions of the fan in step 1108, and cancels the throttling.

FIG. 12 illustrates a change in the CPU temperature in such a fan revolution number control process. When the air-conditioning control device 335 controls the number of revolutions of a fan with a Pulse Width Modulation (PWM) control, the air-conditioning control device 335 outputs a PWM signal to the fan unit 332. In this case, the control unit 112 outputs a control signal for designating a duty ratio of the PWM signal as the control signal for controlling the number of revolutions of the fan.

In the example illustrated in FIG. 12, the target value of the CPU temperature is 70 degrees Celsius, the increment of the duty ratio, which designates the increment of the number of revolutions of the fan in step 1103, is 20 percent, and the decrement of the duty ratio, which designates the decrement of the number of revolutions of the fan in step 1108, is 10 percent. A polygonal line 1201 represents a time change of the duty ratio, whereas a polygonal line 1202 represents a time change of the CPU temperature.

The control unit 112 initially controls the power consumption of the fan unit 332 to be minimized by transmitting, to the air-conditioning control device 335, a control signal of the duty ratio of 0 percent, which designates the minimum value of the number of revolutions of the fan. When the CPU temperature exceeds 70 degrees Celsius at a time t1, the control unit thereafter increments the duty ratio by 20 percent at specified time intervals. When the duty ratio reaches 100 percent, which designates the maximum value of the number of revolutions of the fan, the control unit 112 waits for a certain length of time until a time t2. When the CPU temperature drops to 70 degrees Celsius or lower at the time t2, the control unit 112 thereafter decrements the duty ratio by 10 percent at specified time intervals.

Note that the increment and the decrement of the duty ratio may be changed on the basis of at least one of the temperature of the external air and a CPU load. The length of time to cool down the CPU 601 increases as the temperature of the external air rises. Therefore, it is desirable to change the increment and the decrement of the duty ratio to a larger value. Similarly, the length of time to cool down the CPU 601 increases as the CPU load becomes heavier. Therefore, it is desirable to change the increment and the decrement of the duty ratio to a larger value.

With such a fan revolution number control process, the number of revolutions of the fan is controlled to make the CPU temperature closer to the target value in all cases. As a result, the power consumption of the fan unit 332 is prevented from being increased.

FIG. 13 is a flowchart illustrating another example of the fan revolution number control process executed in step 1004 of FIG. 10. The control unit 112 initially performs a Proportional-Integral-Differential (PID) control for making a CPU temperature closer to a target value, and transmits, to the air-conditioning control device 335, a control signal for designating the number of revolutions of a fan (step 1301). In step 1301, the CPU 601 on which the highest CPU load is currently being imposed or in which the CPU temperature is currently the highest is selected as a target of a temperature control.

Next, the control unit 112 checks whether the number of revolutions of the fan has reached a maximum value (step 1302). When the number of revolutions of the fan has not reached the maximum value ("NO" in step 1302), the control unit 112 repeats the processes in and after step 1301.

In the meantime, when the number of revolutions of the fan reaches the maximum value ("YES" in step 1302), the control unit 112 makes a comparison between the CPU temperature and the target value (step 1303). When the CPU temperature is equal to or lower than the target value ("NO" in step 1303), the control unit 112 repeats the processes in and after step 1301.

In the meantime, when the CPU temperature is higher than the target value ("YES" in step 1303), the control unit 112 performs throttling for the CPU 601 in which the CPU temperature is higher than the target value (step 1304). Then, the control unit 112 repeats the processes in and after step 1301. Thereafter, when the CPU temperature drops to the target value or lower in step 1301, the control unit 112 resets the number of revolutions of the fan, and cancels the throttling.

FIG. 14 illustrates a change in a CPU temperature in such a fan revolution number control process. In the example illustrated in FIG. 14, a target value of the CPU temperature is 70 degrees Celsius, and a polygonal line 1401 represents a time change of a duty ratio, whereas a polygonal line 1402 represents a time change in the CPU temperature.

The control unit 112 initially transmits a control signal of the duty ratio of 0 percent to the air-conditioning control device 335 to control the power consumption of the fan unit 332 to be minimized. Thereafter, the control unit 112 increases the duty ratio as the CPU temperature rises, and decreases the duty ratio when the CPU temperature starts to drop.

With such a fan revolution number control process, the number of revolutions of the fan is controlled to make the CPU temperature closer to the target value in all cases. As a result, the power consumption of the fan unit 332 is prevented from being increased.

The flowcharts illustrated in FIGS. 10, 11, and 13 are merely examples, and some of the processes may be omitted or changed depending on a configuration or a condition of the information processing system 301. For example, when there is a low possibility that the number of revolutions of the fan will reach the maximum value in the fan revolution number control process illustrated in FIG. 11, the processes in steps 1104 to 1107 may be omitted. Similarly, when there is a low possibility that the number of revolutions of the fan will reach the maximum value in the fan revolution number control process illustrated in FIG. 13, the processes in steps 1302 to 1304 may be omitted.

Additionally, in step 1004 illustrated in FIG. 10, the operations of the damper 331, the cooling device 334-1 or the cooling device 334-2 may be controlled instead of controlling the number of revolutions of the fan of the fan unit 332.

Incidentally, there is no need to control the numbers of revolutions of the fans of the fan units 332-1 to 332-3 to become equal in step 1004 illustrated in FIG. 10, and it is sufficient to enable the CPU 601 on which the highest CPU load is currently being imposed or in which the CPU temperature is currently the highest to be selectively cooled down. Accordingly, it is conceivable to perform a control for increasing the number of revolutions of the fan of the fan unit 332 present at a position opposed to the rack 324 including the CPU 601 desired to be cooled down without changing the number of revolutions of fans of the other fan units 332.

FIG. 15 illustrates an example of fan placement information used in such a fan revolution number control process. The fan placement information illustrated in FIG. 15 includes entries such as a fan unit ID 1501, a rack ID 1502, an intra-rack position 1503, and a device ID 1504, and is stored in the storage unit 111.

The fan unit ID 1501 represents identification information of the fan unit 332. F1 to F3 are identification information of the fan units 332-1 to 332-3, respectively. The rack ID 1502 represents identification information of the rack 324. R1 to R3 are identification information of the racks 324-1 to 324-3, respectively. By respectively associating F1 to F3 with R1 to R3, it can be seen that the fan units 332-1 to 332-3 are installed at positions that are respectively opposed to the racks 324-1 to 324-3.

The intra-rack position 1503 represents each of the stages 1U to 42U within each of the racks 324-i illustrated in FIG. 4, and the device ID 504 represents identification information of a device accommodated in each of the stages 1U to 42U. SV1 to SV123 are identification information of the servers 511, whereas SW1 to SW3 are identification information of the switch devices.

In the storage unit 111, configuration information that represents an association between the identification information of each of the servers 511 and that of the CPU 601 included in the corresponding server 511 is also stored. This configuration information and the fan placement information serve as position information that represents relationships between positions of the plurality of CPUs 601 and those of a plurality of fans. The control unit 112 is able to identify a fan unit 332 present at a position opposed to a rack 324 including the CPU 601 desired to be cooled down on the basis of the configuration information and the fan placement information.

In this case, insteps 1101, 1103 and 1108 illustrated in FIG. 11, and step 1301 illustrated in FIG. 13, the control unit 112 identifies the fan unit 332 corresponding to the CPU 601 for which the temperature is to be controlled. Then, the control unit 112 transmits, to the air-conditioning control device 335, a control signal for controlling the number of revolutions of the fan of the identified fan unit 332.

For example, when the CPU temperature of the CPU 601 included in the rack 324-1 exceeds the target value and those of the CPUs 601 included in the racks 324-2 and 324-3 are equal to or lower than the target value, the control unit 112 performs a control for increasing only the number of revolutions of the fan of the fan unit 332-1.

With such a fan revolution number control process, the power consumption of the fan unit 332 corresponding to the rack 324 that does not include the CPU 601 for which the temperature is to be controlled does not increase. As a result, the power consumption is enabled to be prevented from being uselessly increased.

When the fan unit 332 includes a plurality of fans, the number of revolutions may be controlled for each of the fans by using fan placement information including an association between a position of each of the fans and a position within a rack.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A controlling method, comprising:
   determining a target value of a temperature of a processing unit included in an information processing system when first power consumption, which is a total sum of second power consumption of the processing unit and third power consumption of an air-conditioning machine included in the information processing system, indicates a relatively low power consumption by using correlation information corresponding to at least one of a measured temperature and a measured load among a plurality of pieces of correlation information corresponding to a plurality of ranges of at least one of a temperature outside the information processing system and a load of the processing unit, each of the plurality of pieces of correlation information indicating a change in the first power consumption with respect to a change in the temperature of the processing unit; and
   controlling the air-conditioning machine on the basis of the target value.

2. The information processing device, comprising
   a memory configured to store a plurality of pieces of correlation information corresponding to a plurality of ranges of at least one of a temperature outside an information processing system and a load of a processing unit included in the information processing system, each of the plurality of pieces of correlation information indicating a change in first power consumption, which is a total sum of second power consumption of the processing unit and third power consumption of an air-conditioning machine included in the information processing system, with respect to a change in a temperature of the processing unit; and
   a processor configured to determine a target value of the temperature of the processing unit based on the temperature of the processing unit when the first power consumption indicates a relatively low power consumption by using correlation information corresponding to at least one of a measured temperature and a measured load among the plurality of pieces of correlation information stored in the memory, and to output a control signal for controlling the air-conditioning machine based on the target value.

3. The information processing device according to claim 2, wherein the processor determines the correlation information by using a measured value of the first power consumption and a measured value of the temperature of the processing unit, and stores the determined correlation information in the memory.

4. The information processing device according to claim 2, wherein the processor determines the temperature of the processing unit with which the first power consumption is reduced, as the target value, and outputs the control signal for controlling the air-conditioning machine to make the temperature of the processing unit closer to the target value.

5. The information processing device according to claim 2, wherein the processor outputs the control signal for controlling the number of revolutions of a fan included in the air-conditioning machine.

6. The information processing device according to claim 5, wherein
   the memory further stores position information that indicates a relationship between each position of a plurality of processing units including the processing unit and each position of a plurality of fans included in the air-conditioning machine, and
   the processor outputs the control signal for controlling the number of revolutions of a fan present at a position which corresponds to a position of the processing unit included in the correlation information, on the basis of the position information.

7. The information processing device according to claim 2, wherein the second power consumption includes a total sum of power consumptions of a plurality of processing units including the processing unit.

8. A non-transitory computer-readable recording medium having stored therein a program for causing a computer to execute a process comprising:
   determining a target value of a temperature of a processing unit included in an information processing system when first power consumption, which is a total sum of second power consumption of the processing unit and third power consumption of an air-conditioning machine included in the information processing system, indicates a relatively low power consumption by using correlation information corresponding to at least one of a measured temperature and a measured load among a plurality of pieces of correlation information corresponding to a plurality of ranges of at least one of a temperature outside the information processing system and a load of the processing unit, each of the plurality of pieces of correlation information indicating a change in the first power consumption with respect to a change in the temperature of the processing unit; and outputting a control signal for controlling the air-conditioning machine on the basis of the target value.

\* \* \* \* \*